May 16, 1950     M. H. FISHER     2,508,151

DIRECT-CURRENT MOTOR

Filed April 19, 1947

WITNESSES:
Robert C Baird

INVENTOR
Martin H. Fisher
BY
Paul E. Friedemann
ATTORNEY

Patented May 16, 1950

2,508,151

UNITED STATES PATENT OFFICE 2,508,151

DIRECT-CURRENT MOTOR

Martin H. Fisher, Pittsburgh, Pa., assignor to Westinghouse Electric Corporation, East Pittsburgh, Pa., a corporation of Pennsylvania Application April 19, 1947, Serial No. 742,671

11 Claims. (Cl. 318—158)

1

This invention relates to a reversible electric drive of the type in which a direct current motor is provided with a variable voltage from a direct current generator, and more particularly, to an improved direct current motor which may have its direction of rotation reversed without the necessity of breaking its armature circuit and without altering its speed torque characteristics upon reversal.

Variable voltage drives of the type in which a direct current motor is supplied with a variable voltage from a direct current generator are well known and have considerable use because of the wide speed range provided by such a drive and its overall operating efficiency. In order to secure good speed regulation of the direct current motor, it is desirable that the motor have a speed torque characteristic, such that the speed of the motor will decrease with increasing loads, and to this end such motors are usually provided with a cumulatively compounded series field. The use of the series field in such an arrangement gives rise to a disadvantage in effecting a reversal of the direction of rotation of the motor. In order to reverse the direction of rotation of the motor, it is necessary to reverse the motor armature connections without reversing the direction of current flow in the series field circuit to prevent the characteristics of the motor from being changed from those of a cumulatively compounded machine to those of a differentially compounded machine. This fact necessitates the provision of a reversing switch having four contactors which must carry the full-load current of the motor armature to secure reversal. The operation of the reversing switch to secure reversal of the direction of rotation of the motor results in discontinuity in the operation of the motor as its direction of rotation is reversed with consequent current peaks in the armature circuit of the motor and a jarring action on the drive as the reversal is effected.

One of the principal objects of this invention is to provide a direct current motor having a drooping speed load characteristic which may have its direction of rotation reversed without the necessity of interrupting its armature circuit.

Another object of the invention is to provide a direct current motor in which there is provided a speed torque characteristic such that the speed of the motor decreases with increasing loads by means other than a cumulatively compounded series field.

A further object of the invention is to provide a novel arrangement of interpole excitation for a direct current motor which is effective to vary the speed load characteristics of the motor.

A still further object of the invention is to provide the interpoles of a direct current motor with an auxiliary winding connected in shunt across the armature circuit of the motor for imparting to the motor desired speed load characteristics.

Other objects and advantages of the invention

2 will become apparent during the course of the following description taken in connection with the accompanying drawing, in which:

Figure 1:
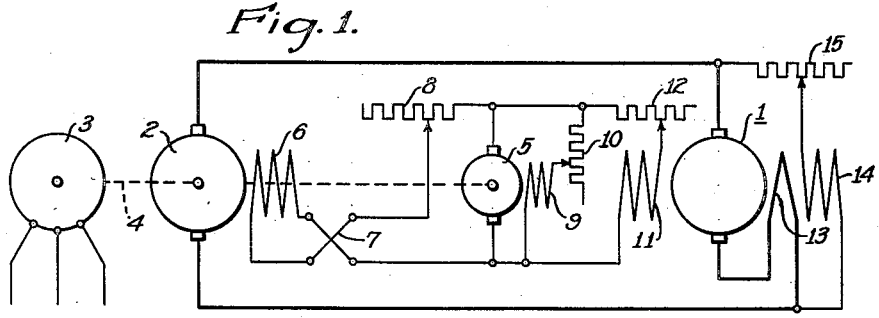
Figure 1 is a schematic illustration of a reversible electric drive constructed in accordance with the principles of this invention.

Referring to Fig. 1, the numeral 1 designates a direct current motor having its armature connected in series with the armature of a direct current generator 2. The armature of the direct current generator 2 is mechanically connected to an alternating current motor 3, the mechanical connection being diagrammatically illustrated by the broken line 4. The motor 3 also drives a direct current exciting generator 5 through the mechanical connection 4. A generator field 6 is connected to the armature circuit of the exciting generator 5 through a reversing switch 7 and a variable resistance or rheostat 8. Variation of the setting of the rheostat 8 is effective to vary the excitation of the field 6 and the voltage output of the generator 2 in a manner well known in the art. Operation of the reversing switch 7 is effective to reverse the direction of current flow in the generator field 6 to reverse the polarity of the voltage produced by the generator 2.

The field excitation generator 5 is illustrated as being of the self-exciting type having an exciting field 9 connected across its armature circuit by an adjustable rheostat 10. The generator 5 also supplies the exciting current for the motor field 11 which may be varied by adjusting the setting of a rheostat 12. The excitation of the generator field 6 and the excitation of the motor field 11 may be varied simultaneously by operation of the rheostat 10, or such fields may be varied independently of each other by operation of the rheostats 8 and 12.

The interpole excitation for the motor 1 is provided by a winding 13 connected in series with the armature of the motor 1 and a winding 14 connected in parallel or shunt with the motor 1 through an adjustable resistance or rheostat 15.

Figure 2:
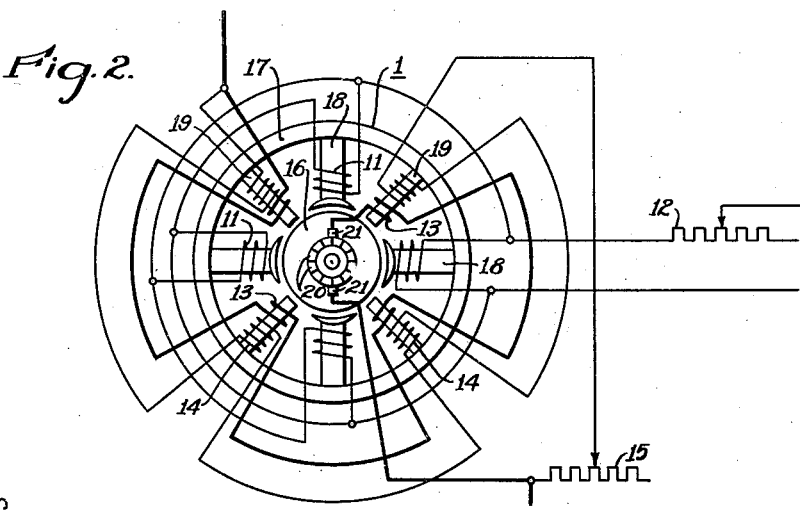
Fig. 2 is a diagrammatic showing illustrating the construction of the motor shown in Fig. 1.

The construction of the motor 1 is illustrated in Fig. 2 and, in this showing, the motor is illustrated as having its armature 16 rotatably mounted in a magnetic frame 17 having main poles 18 and interpoles or commutating poles 19 mounted therebetween. The armature 16 is provided with commutator bars 20 and brushes 21 with which the interpole fields 13 are connected in series. This showing also illustrates the arrangement of the auxiliary coils or windings 14 on the interpoles 19. The main field excitation for the motor 1 is provided by the windings 11 on the main poles 18.

Figure 3:
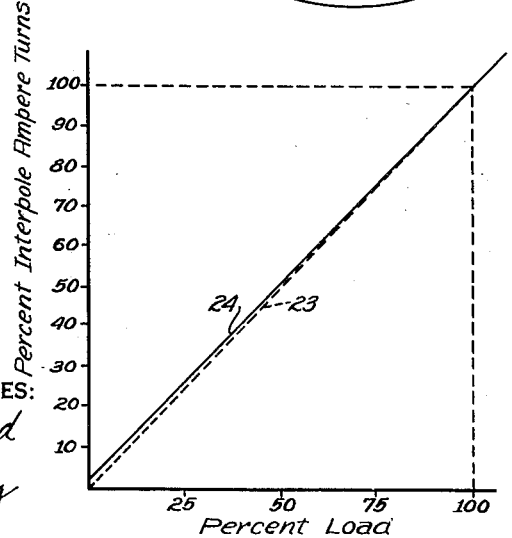
Fig. 3 is an explanatory graph.

The use of interpoles, such as the poles 19, for the purpose of providing a commutating field to assist in commutation of the armature windings is well known in the art. Such interpoles are commonly provided with windings connected in series with the armature circuit of the motor to provide a commutating field which varies in strength with the load on the motor armature. Referring to Fig. 3, the broken line 23 illustrates the manner in which the strength of the interpole or commutating field varies with the loading of the armature, the ampere turns in the windings for the interpoles increasing with the armature loading. The solid line 24 indicates the manner in which the interpole field excitation of a motor provided with the shunt field windings 14, according to this invention, varies with the loading on the motor. In the preferred practice of the invention, the rheostat 15 is adjusted so that the windings 14 provide a given percentage of the total commutating field required at a predetermined loading on the motor 1. As illustrated in Fig. 3, the loading at which the windings 14 provide such given percentage of the commutating field is illustrated as being at 100% loading of the motor and at this loading the lines 23 and 24 cross. As the loading of the motor is decreased, it will be seen from an examination of Fig. 3 that the percentage of interpole ampere turns or interpole field excitation provided by the windings 14 increases as the loading on the motor decreases. There is thus provided for the motor loadings of less than 100% an interpole excitation which becomes increasingly greater than is necessary for commutation purposes. This additional excitation provided by the interpole windings 14 induces circulating currents in the armature windings thereby producing an armature field opposing the field provided by the main poles 18. Accordingly, it will be seen that as the loading is decreased the net effective strength of the main fields 18 is decreased and there will be provided an increase in the speed of the motor as the load on the motor is decreased. Conversely as the load on the motor increases from no-load the speed of the motor will decrease. It will thus be apparent that the provision of the auxiliary coil or winding 14 provides the motor with a drooping speed load characteristic without the necessity of providing a series winding in the main field of the motor. It will also be apparent that the speed load characteristics of the motor may be readily varied by adjustment of the rheostat 15 to vary the excitation of the interpole shunt winding 14.

In actual practice, it has been found that good regulation of the motor may be had if the windings 14 are adjusted to provide 1½% of the total interpole ampere turns required for good commutation at 100% motor loading. On the basis of the information presently available, the only limitation on the percentage of ampere turns provided by the windings 14 is that such percentage should not be sufficiently great to interfere with good commutation when the motor is lightly loaded. Although Fig. 3 shows the lines 23 and 24 crossing at 100% loading, other predetermined loadings at which such lines cross may be selected without interfering materially with the effect provided by the interpole windings 14. Since the effect of the interpole windings 14 on the total interpole field for relatively heavy loadings on the motor is comparatively small, the lines 23 and 24 need not cross as shown in Fig. 3 and the line 24 may be made to run parallel with the line 23. However, in all such cases it will be seen that the percentage of ampere turns provided by the winding 14 will increase as the ampere turns provided by the winding 13 decrease with decreasing loads.

From the foregoing, it will be apparent that the provision of the auxiliary interpole winding 14 is effective to provide the motor with the required speed torque characteristics for good regulation. Since it is not necessary to provide a main series field with this arrangement, the direction of rotation of the motor may be readily reversed by reversing the polarity of its variable voltage supply. As shown in Fig. 1, this can be accomplished by operation of the reversing switch 7 without the necessity of breaking the armature circuit to the motor 1. By reason of this arrangement then, it will be apparent that reversal of the motor will be effected smoothly without the jarring operation which would be otherwise incident to the interruption of its armature circuit. Attention is also particularly invited to the fact that the polarity of the interpole fields 13 and 14 automatically change upon reversal of the polarity of the voltage supplied to the armature of the motor 1, this feature being necessary to good commutation in both directions of rotation of the motor.

Since certain changes may be made in the above-described construction and different embodiments of the invention may be made without departing from the spirit and scope thereof, it is intended that all the matter contained in the above description and shown in the accompanying drawing shall be considered as illustrative and not in a limiting sense.

I claim as my invention:

1. The combination with a direct current motor having an armature and a magnetic structure having main poles and interpoles therebetween, of circuit means for energizing said interpoles including a winding on said interpoles providing a substantially constant number of ampere turns, and a second winding on said interpoles providing a number of ampere turns varying with the load on said motor, said first winding being cumulative with respect to said second winding providing substantially all the energization for said interpoles at the no-load speed of said motor and a decreasing percentage of the interpole energization as the motor loading increases, the energization of said interpoles at no-load speed being sufficiently great to increase the no-load speed by inducing currents in said armature to produce an armature field opposing the field of said main poles but insufficient to interfere with commutation.

2. In combination with a direct current motor, a coil for producing a commutating field variable with the load on said motor, a second coil cumulatively arranged with respect to said first coil for producing a substantially constant field, said second coil providing a predetermined percentage of the necessary commutating field at a predetermined motor loading and an increasing percentage of the commutating field for motor loadings less than said predetermined loading.

3. The combination with a direct current motor having a main pole field and an interpole field, of circuit means for energizing said interpole field including a coil having a circuit in which the current varies with the motor loading, said coil providing less than the field energization required for commutation at a predetermined motor loading, and a second coil having substantially constant energization cumulatively arranged with respect to said first coil to provide the additional field energization required at said predetermined loading, said second coil providing increasing percentages of said interpole field energization for motor loadings less than said given loading.

4. In combination, a direct current motor having main poles and interpoles therebetween, and circuit means for energizing said interpoles including a coil having a circuit in which the current varies with the load on said motor, and a second coil in which the current is substantially constant for all motor loadings, said second coil providing substantially all the energization of said interpoles at no-load speed and being effective to produce an increase in the speed of said motor as its loading is decreased.

5. In combination, a direct current motor having an armature circuit, a magnetic frame having main poles and interpoles, and means for energizing said interpoles comprising a winding connected in series with said armature circuit, and a winding connected in shunt with said armature circuit, the energization of said interpoles at no-load speeds being supplied substantially entirely by said shunt winding and being sufficient to produce an armature flux in opposition to the flux of said main poles to thereby increase the no-load speed of the motor.

6. The combination claimed in claim 5 wherein the maximum energization of said shunt coil is insufficient to interfere with the commutation of said motor at no-load speeds.

7. A reversible electric drive comprising, in combination, a direct current motor having an armature and a magnetic frame having main poles and interpoles, a source of direct current connected to said armature, circuit means for energizing said interpoles including a coil having a circuit in which the current varies with the armature current of said motor, a second coil in which the current is substantially constant for all motor loadings, said second coil providing substantially all the energization of said interpoles at the no-load speed of said motor and being effective to produce an increase in the speed of said motor as its loading is decreased, and means for reversing the polarity of said direct current source to reverse the direction of rotation of said motor.

8. A reversible electric drive comprising, in combination, a direct current motor having an armature and a magnetic frame having main poles and interpoles, a source of direct current connected to said armature, a circuit means for energizing said interpoles comprising a winding connected in series with said armature circuit, and a winding connected in shunt with said armature circuit, the energization of said interpoles at no-load speeds being supplied substantially entirely by said shunt winding and being sufficient to produce an armature flux in opposition to the flux of said main poles to thereby increase the no-load speed of the motor, and means for reversing the polarity of said direct current source to reverse the direction of rotation of said motor.

9. A reversible electric drive comprising, in combination, a direct current motor and a direct current generator respectively having their armatures connected in a series circuit, said motor having a magnetic frame providing main poles and interpoles, a field winding for said generator, a source of direct current for energizing said field winding, circuit means for energizing said interpoles including a coil having a circuit in which the current varies with the armature current of said motor, a second coil in which the current is substantially constant for all motor loadings, said second coil providing substantially all the energization of said interpoles at the no-load speed of said motor and being effective to produce an increase in the speed of said motor as its loading is decreased, and means for reversing the rotation of said motor comprising means for reversing the polarity of said direct current source.

10. A reversible electric drive comprising, in combination, a direct current motor and a direct current generator respectively having their armatures connected in a series circuit, said motor having a magnetic frame providing main poles and interpoles, a field winding for said generator, a source of direct current for energizing said field winding, circuit means for energizing said interpoles comprising a winding connected in series with said armature circuit, and a winding connected in shunt with said armature circuit, the energization of said interpoles at no-load speeds being supplied substantially entirely by said shunt winding and being sufficient to produce an armature flux in opposition to the flux of said main poles to thereby increase the no-load speed of the motor, and means for reversing the rotation of said motor comprising means for reversing the polarity of said direct current source.

11. A shunt excited direct current motor having a drooping speed-load characteristic similar to that of a series excited motor comprising an armature and a magnetic structure having main poles and interpoles therebetween, a shunt winding providing substantially constant excitation for said main poles, and excitation means for said interpoles comprising a first winding connected in series with said armature, and a second winding cumulatively arranged with respect to said first winding and providing substantially constant interpole excitation, said first and second windings cooperating to provide the interpole field necessary for commutation at a predetermined motor loading, said second winding operating to provide an interpole field greater than that necessary for commutation as the load on said motor decreases with respect to said predetermined loading so that the percentage of total interpole excitation provided by said second winding increases with decreasing motor loads, the interpole field produced by said second winding beyond that necessary for commutation being operative to induce circulating currents in said armature to produce an armature field opposing that provided by said main poles, said armature field being effective to decrease the total effective field of said main poles as the motor load decreases and to thereby increase the speed of the motor as its load decreases.

MARTIN H. FISHER.

REFERENCES CITED

The following references are of record in the file of this patent:

UNITED STATES PATENTS

| Number | Name | Date |
|---|---|---|
| 846,422 | Oelschlager | Mar. 5, 1907 |
| 945,103 | Lord | Jan. 4, 1910 |
| 1,910,473 | McNeil | Mar. 23, 1933 |

FOREIGN PATENTS

| Number | Country | Date |
|---|---|---|
| 82,308 | Austria | Jan. 10, 1921 |